US010708434B1

(12) United States Patent
Scheet et al.

(10) Patent No.: US 10,708,434 B1
(45) Date of Patent: Jul. 7, 2020

(54) ENHANCED CONFERENCE ACCESS AND CONTROL

(71) Applicant: West Corporation, Omaha, NE (US)

(72) Inventors: David Scheet, Omaha, NE (US); Craig A. Webster, Elkhorn, NE (US)

(73) Assignee: West Corporation, Omaha, NE (US)

( * ) Notice: Subject to any disclaimer, the term of this patent is extended or adjusted under 35 U.S.C. 154(b) by 0 days.

(21) Appl. No.: 15/798,668

(22) Filed: Oct. 31, 2017

(51) Int. Cl.
*H04M 3/56* (2006.01)
*H04L 29/06* (2006.01)
*H04W 4/14* (2009.01)

(52) U.S. Cl.
CPC ............ *H04M 3/56* (2013.01); *H04L 65/403* (2013.01); *H04W 4/14* (2013.01)

(58) Field of Classification Search
None
See application file for complete search history.

(56) References Cited

U.S. PATENT DOCUMENTS

| | | | | |
|---|---|---|---|---|
| 6,956,848 B1 * | 10/2005 | Keung | .................. | H04M 3/537 370/356 |
| 8,229,096 B1 * | 7/2012 | Marquis | ................ | H04M 3/562 348/14.09 |
| 8,576,750 B1 * | 11/2013 | Hecht | ..................... | H04M 3/56 370/261 |
| 8,681,964 B1 * | 3/2014 | Cordell | ................ | G06Q 10/109 379/204.01 |
| 8,804,576 B2 * | 8/2014 | Fuse | .................... | H04L 12/1831 370/260 |
| 2004/0019678 A1 * | 1/2004 | St. Pierre | ................ | G06F 9/547 709/225 |
| 2007/0280464 A1 * | 12/2007 | Hughes | .................. | H04M 7/003 379/205.01 |
| 2007/0291917 A1 * | 12/2007 | Berstis | .............. | H04M 3/42374 379/202.01 |
| 2009/0178128 A1 * | 7/2009 | Chiba | .................... | H04L 67/125 726/7 |
| 2010/0027775 A1 * | 2/2010 | I'Anson | .......... | H04M 1/274575 379/202.01 |
| 2011/0007887 A1 * | 1/2011 | Green | ..................... | H04M 3/56 379/203.01 |
| 2011/0051917 A1 * | 3/2011 | Chen | ........................ | H04M 3/56 379/202.01 |
| 2012/0230484 A1 * | 9/2012 | Kannappan | ........... | H04M 3/565 379/202.01 |
| 2013/0090098 A1 * | 4/2013 | Gidwani | ........... | H04M 1/72566 455/414.1 |
| 2013/0282803 A1 * | 10/2013 | Boyer | ..................... | H04N 7/147 709/204 |
| 2014/0161243 A1 * | 6/2014 | Contreras | ............... | H04M 3/56 379/202.01 |

(Continued)

*Primary Examiner* — Chi H Pham
*Assistant Examiner* — Vladislav Y Agureyev

(57) ABSTRACT

Processing customer communications may include receiving a communication from a customer device via a messaging application. One example method of operation may include transmitting a message from a conference call server to a user device, receiving a response message from the user device, extracting the response message data, processing the response message data and identifying one or more conference call preferences, and transmitting a notification to the user device when a conference call date occurs.

20 Claims, 5 Drawing Sheets

(56) References Cited

U.S. PATENT DOCUMENTS

| | | | |
|---|---|---|---|
| 2014/0247933 A1* | 9/2014 | Soundar | H04M 3/5183 |
| | | | 379/211.02 |
| 2014/0321631 A1* | 10/2014 | Wu | H04L 63/083 |
| | | | 379/202.01 |
| 2016/0065742 A1* | 3/2016 | Nasir | H04M 3/56 |
| | | | 455/416 |
| 2016/0219435 A1* | 7/2016 | Mistry | H04W 12/06 |
| 2016/0277585 A1* | 9/2016 | Efrati | H04M 3/56 |

* cited by examiner

ENHANCED CONFERENCE ACCESS AND CONTROL

TECHNICAL FIELD OF THE APPLICATION

This application relates to a conference call bridging callback function and more specifically to providing enhanced conference access and control and establishing a callback procedure prior to a conference to optimize caller participation and convenient call establishment.

BACKGROUND OF THE APPLICATION

Conventionally, when a conference call is scheduled, a scheduled conference date may be set, and other information may be recorded in the form of an electronic calendar or other application used to manage the conference call.

Some states have laws forbidding users from holding a phone while driving as well as forbidding users from performing more than a couple of phone taps, which could preclude dialing numbers, text messaging, and/or accessing certain applications requiring textual input. Some users are chronically late for conference calls for various reasons. Others complain of not understanding how to dial into the conference or losing the conference information altogether. Many users appreciate the convenience of being called by the conferencing system and pressing "1" to join versus dialing the number and entering the conference code among other information and then waiting for others to join the call.

SUMMARY OF THE APPLICATION

Example embodiments of the present application provide at least a method that includes at least one of transmitting a message from a conference call server to a user device, receiving a response message from the mobile device, extracting the response message data, processing the response message data and identifying one or more conference call preferences, and transmitting a notification to the mobile device when a conference call date occurs.

Another example embodiment may include an apparatus that includes a transmitter configured to transmit a message from a conference call server to a user device, a receiver configured to receive a response message from the user device, a processor configured to extract response message data, process the response message data and identify one or more conference call parameters, and the transmitter is further configured to transmit a notification to the user device when a scheduled conference call time has matured.

Still another example embodiment may include a non-transitory computer readable storage medium configured to store instructions that when executed causes a processor to perform transmitting a message from a conference call server to a user device, receiving a response message from the user device, extracting response message data, processing the response message data and identifying one or more conference call parameters, and transmitting a notification to the user device when a scheduled conference call time has matured.

DETAILED DESCRIPTION OF THE APPLICATION

Figure 1:
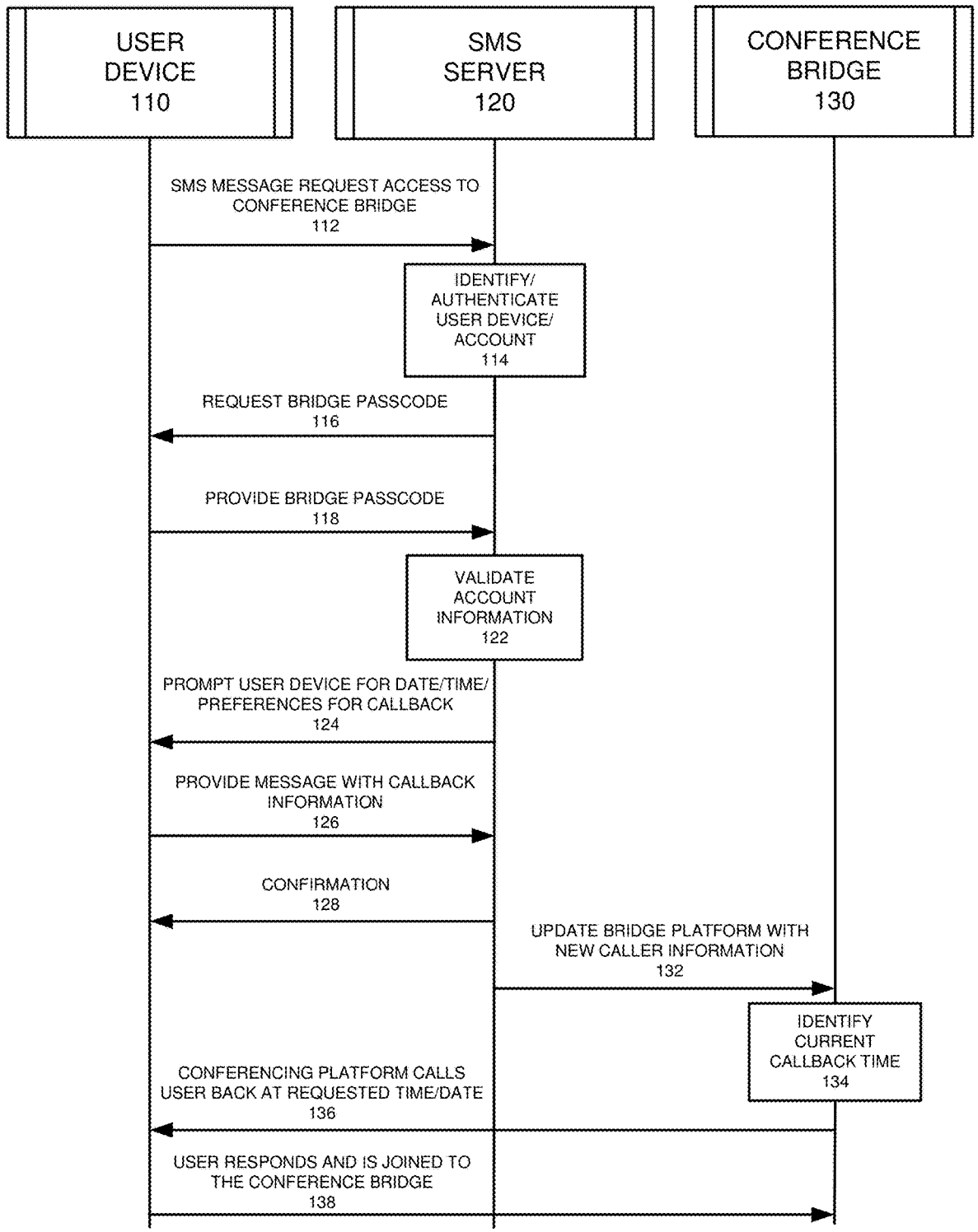
FIG. 1 illustrates an example system signaling communication example of establishing a conference callback according to example embodiments.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

According to example embodiments, a user device, such as a smartphone, cellular phone, tablet device, laptop or other computing device with a memory and processor, may communicate with a conference call setup and bridging application. The communications performed to setup the conference call, attend the conference call, etc., may be performed through a combination of mediums, such as phone calls, text messages including but not limited to short message service (SMS) messaging, and e-mail. Also, other communication mediums may be used to communicate with the user device and the conference call management server 'conference server' and/or conference call bridge server 'bridge server'. In one example, the interaction between a user device and the servers may begin with an inbound voice call/SMS message, in this example. It could also be initiated by an outbound call or SMS message. The application may prompt the caller to select a conference, respond to a pending invitation or initiate a new conference procedure.

The user information can be collected and stored in a data repository managed by the servers.

FIG. 1 illustrates an example system signaling communication example of establishing a conference callback according to example embodiments. In this example 100, the user device 110 is communicating with a conference application or via a conference telephone number via SMS signaling to setup a conference callback with a SMS conference server 120. The user device is scheduling in advance to be called by the conference bridge 130 at the appointed time of a meeting. In operation, the user device 110 may submit a SMS message to request access 112 to the conference bridge 130 via a callback option. The process may begin with another user setting up the conference, which triggers a message being sent to the user device to select a callback option. The SMS server 120 may then identify the user device and authenticate the user device 114 as a member of the existing conference. Also, the user may be a leader or initiator looking to setup the conference, in which case the authentication procedure is attempting to identify the user device as a registered member of the conference call application.

In one example, a button or menu option may be embedded within a calendar application, such as OUTLOOK or other mail/calendar applications. The user device may call into the conference bridge manually to register via a phone or SMS text messaging. At any time, the conference bridge 130 may store the user device information profile and reference the information to identify and authorize the user device. Also, the profile may be linked to callback options, including devices to be called, a time to call (e.g., once all other participants have joined, 5 minutes prior, 10 minutes prior, 1 minute prior, once the leader has joined, etc.). Also, other options may include to send a web link to access the conference, dial the user device as a call, initiate the conference application on the device, etc.

Continuing with the same example, the SMS server 120 may require a bridge code passcode 116 from the user device. The user device 110 may provide the bridge code passcode 118 based on a previous SMS message or e-mail. Also, the application may search for the passcode based on a date or other parameter that is linked to the conference call so the user does not have to open a previously received e-mail or find the passcode, as the user may be busy driving or walking, etc. The SMS server 120 may then validate 122 the account information and access the scheduled conference call to link the user profile to the actual conference data. The SMS server 120 may then prompt the user device via another SMs message to submit the date, time, and other preferences associated with the callback option 124. The user device 100 may then provide the message with callback information 126 and receive a confirmation 128 of the completed task of establishing the callback. All such information related to the interaction may then be sent 132 to the conference bridge 130 for updating the user profile. At a later time, the conference bridge 130 may then identify the current callback time has matured 134. The bridge 130 may initiate a call or link to the user device 136 at the specified time. The user may respond and is joined to the conference bridge 138.

Figure 2:
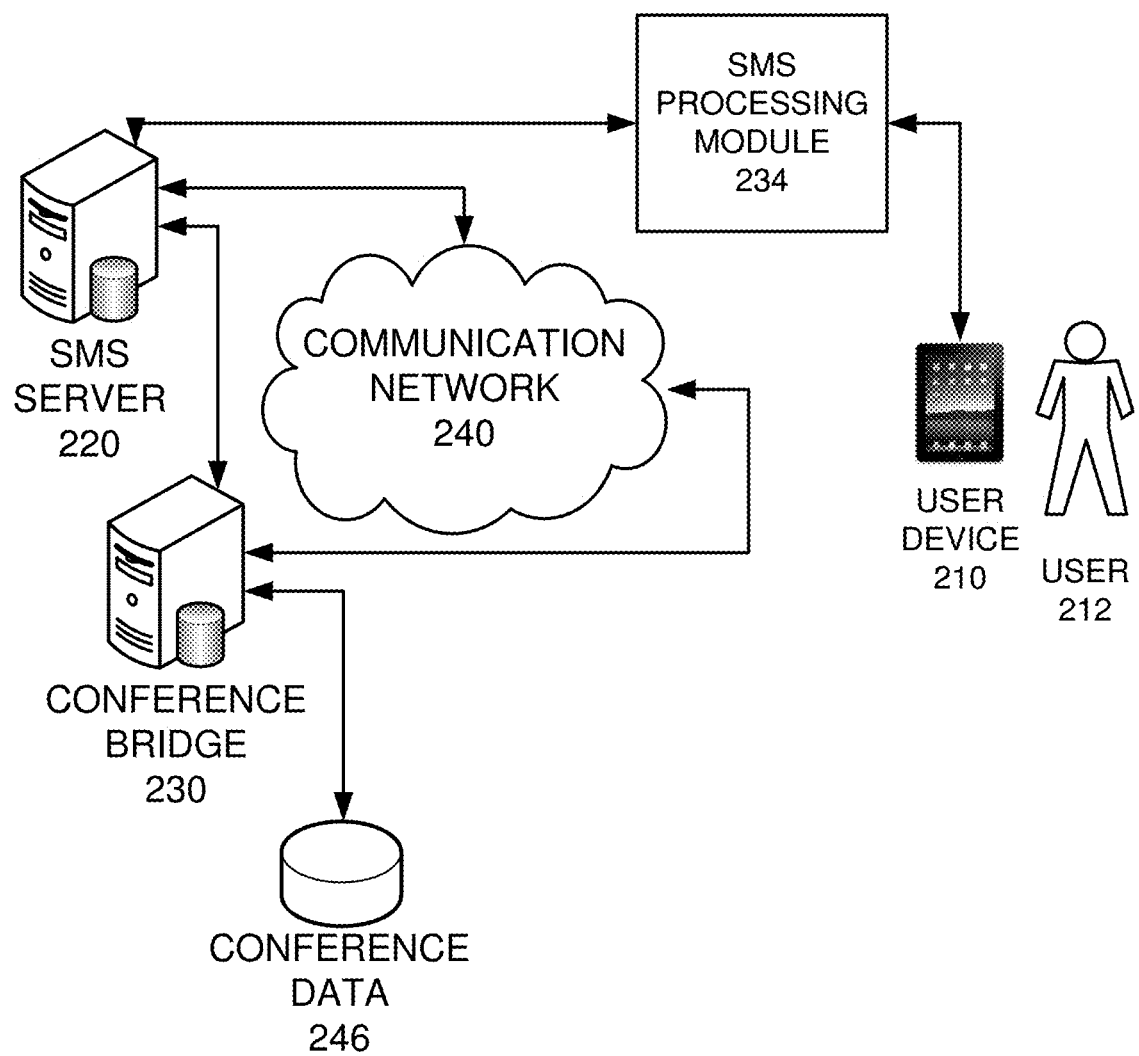
FIG. 2 illustrates an example network configuration according to example embodiments.

FIG. 2 illustrates an example network configuration according to example embodiments. Referring to FIG. 2, the communication network 200 may include a user device 210, a user 212, the SMS server 220 and a conference call bridge 230, which references conference data 246. The SMS messages sent to the SMS server and to the user device 210 may be routed through a communication network 240 which may include the cellular network, the Internet or other communication platforms. The SMS processing module 234 may provide a text interpretation engine that parses the content of the use text messages sent and identifies parameters needed to update the user's callback profile. Examples may include, dates, names, periods of time prior to conference start times, devices to call, type of communication to link the call, etc. Any updates to a user profile including preferences, currently pending callbacks or other user profile data is updated and stored in the conference data repository 246.

Figure 3:
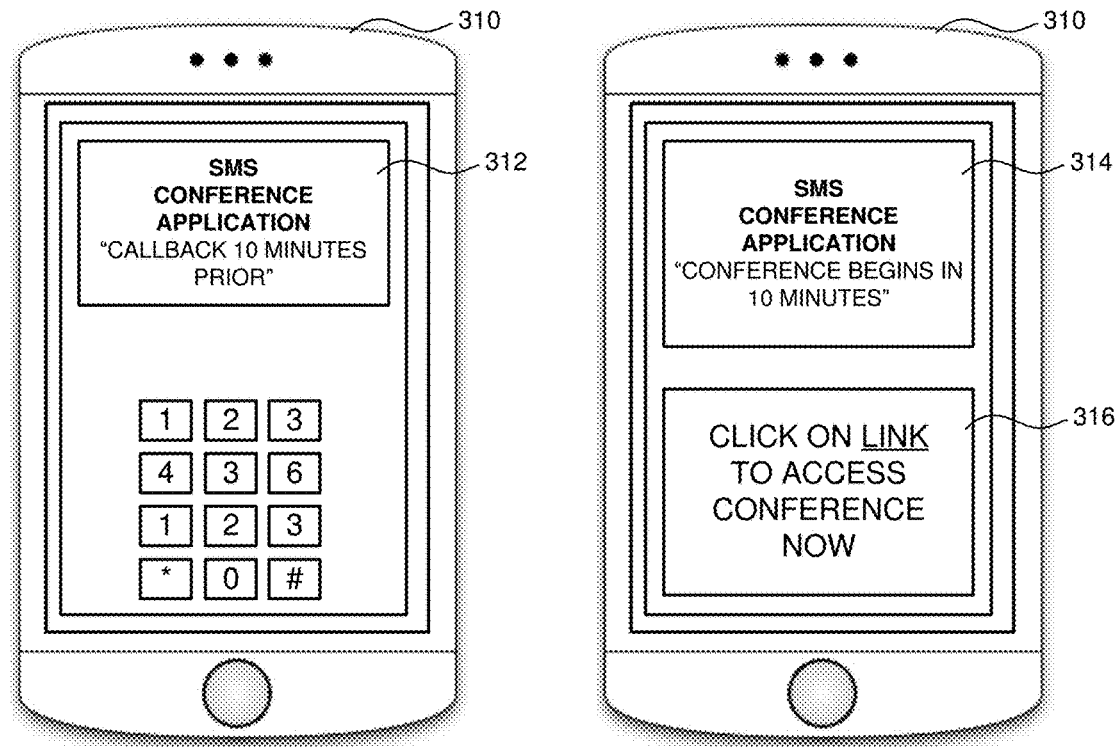
FIG. 3 illustrates a graphical user interface of a user device receiving a callback via a messaging platform according to example embodiments.

FIG. 3 illustrates a graphical user interface of a user device receiving a callback via a messaging platform according to example embodiments. In this example, the illustration 300 includes a graphical user interface for the user's device 310 with a first scenario having a SMS conference application 312 that prompts the user for information and confirmation data. Exchanges between the SMS server and the user device may include messages, such as "Please always call me on my mobile at the start of a conference call if I have accepted the meeting". Also, the profile configuration may be modified based on certain input, such as "if I haven't joined a bridge within 5 minutes of the start of the meeting then call me at my mobile, then try my office phone." A website URL may be included in a meeting invite with a pre-validation process the first time for a given phone number. It may be a standard website requiring login and/or may include a mobile application. As for email and social media, such as TWITTER, for example, there may be a leader option for pre-authorization at a scheduled time, such as to a mobile phone or other phone associated with a user account, for example, a leader option to require re-authorization at time of a call may provide examples of data gathered at registration time: date of call, time of call (including time zone), conference code, phone number (defaults to my mobile if not supplied).

The conferencing configuration could have a unique number associated with every meeting. The user could utilize this meeting number instead of having to enter a date and time. The conferencing system maintains a list of invited attendees as well as which attendees have registered to be called via a callback. People can register for a meeting once the leader (or designee of the leader) has scheduled the meeting. In FIG. 3, the user device is submitting a first request for a minute callback 312 via a first SMS session. The next scenario is a subsequent callback SMS session where the user receives the update that the conference begins in 10 minutes 314. The SMS message may include a link to access the conference 316 as well as other information pertaining to the active call or web session. The link may be embedded in a social network message application associated with the social network communication previously conducted in lieu of the meeting assignment link, and this may include various personal or business related social media sites or applications.

Figure 4:
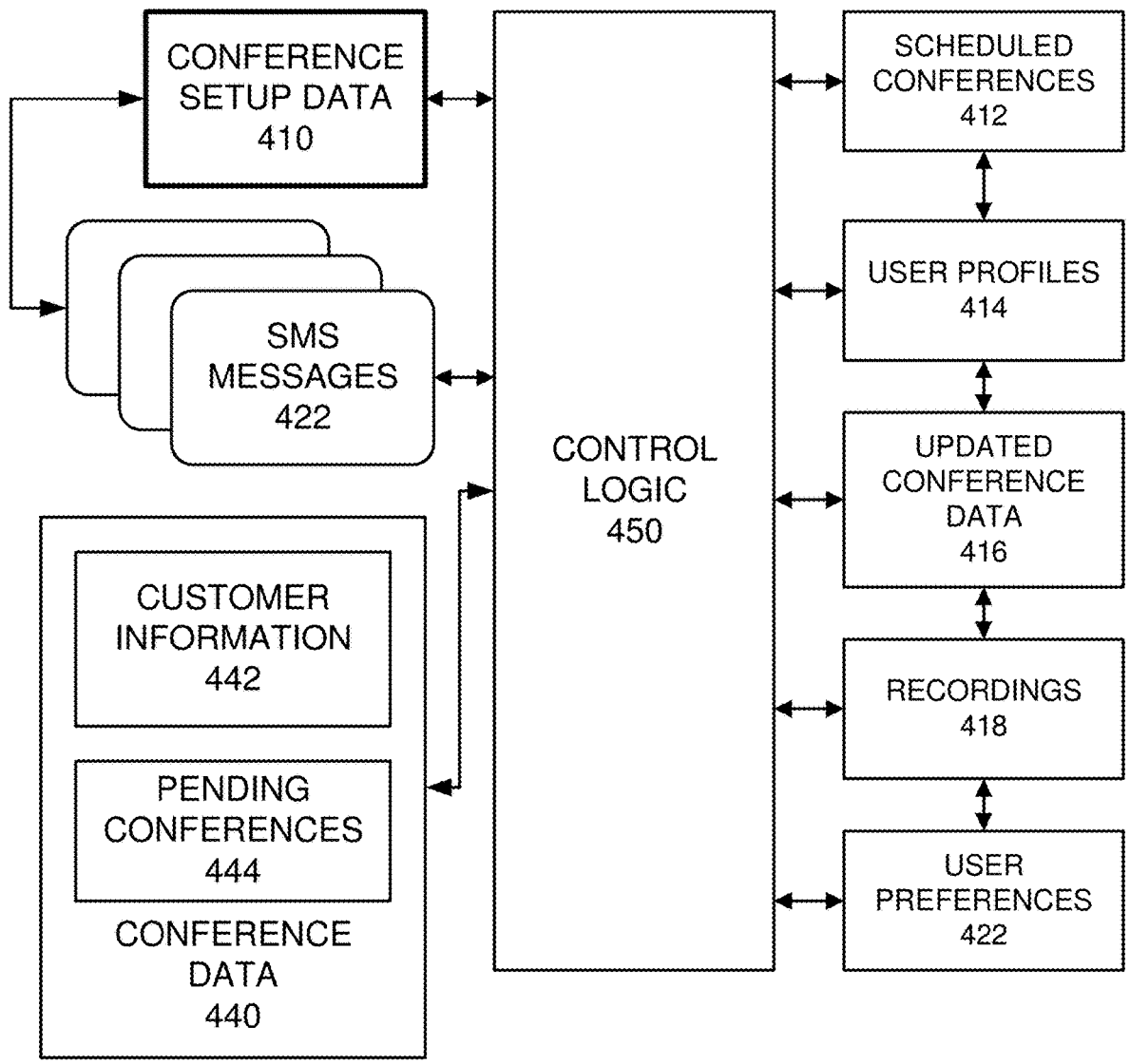
FIG. 4 illustrates a logic diagram for processing SMS communications for a conference call according to example embodiments of the present application.

FIG. 4 illustrates a logic diagram for processing SMS communications for a conference call according to example embodiments of the present application. Referring to FIG. 4, the logic may include a processor or controller 450 which receives a set of input, such as SMS messages 422, and extracts conference setup data 410. The conference data may be stored in a datastore 440 that has customer information 442 and pending conferences 444. As the data from the SMS messages is extracted via NLP and other processing techniques, the conference data is updated based on the output of the processing entities. The output may include scheduled conferences 412, user profiles 414, updated conference data 416, recordings from the call conferences 418 and user preferences 422, all such extracted conference data may be stored in the conference repository.

In addition to conference callback scheduling and configurations, certain enhanced conferencing access and control features may also be provided by the conferencing application. In general, "conferencing" can include any combination of audio, video, and/or web conferencing associated with a particular meeting. The owner of a given conferencing account may access conference setup features, such as scheduling conferences. Traditionally, scheduling is performed via email invites, where participants can accept/acknowledge invites and have the event placed on their calendar. The invite may include phone numbers or links to phone numbers to dial for various participants around the globe, as well as a conference ID and optional security passcode.

Example embodiments may include various additional methods (channels) for scheduling conferences among multiple users. One example may be a social media account, such as TWITTER, FACEBOOK, SLACK, GOOGLE PLUS+/HANGOUTS, SKYPE, etc., and also a phone call to an IVR application, mobile application, short message service (SMS), web chat, home automation systems, such as AMAZON ALEXA/ECHO GOOGLE HOME, etc. In this example, the access to a conference, which may also include an email message and/or a web portal, any of those methods are integrated with an intelligent virtual assistant that is integrated with the conferencing platform and scheduling systems. The automation systems especially may utilize AI-powered bots to enable conversational interfaces to leaders and participants for controlling and accessing conferences.

In operation, using any of the example methods to connect to a conference, the leader can say, "I want to schedule a conference call with my management team tomorrow at 3 pm" for example, and the underlying bot determines whether it has all the information needed to proceed. If not, the 'bot' application prompts for the missing information. If all information is provided, the 'bot' proceeds to interact with the scheduling system to generate the appropriate invites to the appropriate participants.

A leader can initiate an unscheduled conference call at any time via any of the available channels. For example, if a leader speaks or writes: "Start my bridge and connect to Bob, Susan, and John, send an invite to Bill as well". The bot module will process the text, and assuming all required information is included in the instruction, interfaces to the conferencing platform may be initiated to the bridge and to the requested participants. The bot also interfaces to the scheduling system to send an invite to 'Bill'. In addition to the ad hoc option, a leader can say, "Start my bridge at the top of the hour without me, and connect my direct reports". These interactions can happen via any of the described channels (e.g., voice, text, web, etc.).

In one example, when a participant device receives an invite, such as via email, for a scheduled conference, the participant (or assistant) accepts or rejects the invite, and his/her schedule is updated accordingly to reflect the acceptance. The invite could contain additional links that send the participant to a web-page or mobile application where the participant could select new options, such as "call my mobile at the start of the conference". At meeting time, the conferencing platform dials the participant. Multiple security options can be selected by the leader. The participant can be immediately joined to the bridge, or the participant can be required to enter a passcode or speak a password/phrase. Alternately, the participant can setup preferences as part of their use profile. Such preferences can specify that the participant is always called at the start of a conference in order to join the call on time. The preference profile could include a set of phone numbers to dial in a specified order in an attempt to reach the participant. For unscheduled meetings initiated by a leader, participants could be dialed according to their preference profiles, unless overridden by the leader at request time. For example, the leader could say, "Start my bridge and connect John at his home, Susan at her office, and Bill on his mobile phone" at which time the bot would interface to the conferencing platform to initiate the bridge and perform the outdial actions.

The process of registration may include an email invite which contains a link to a mobile optimized web page or mobile application. The page/application could confirm what number the participant would like to be contacted, as well as how much time prior to the conference start time the participant would like to be contacted. Additionally, moderator information could also be entered, such as having the system automatically start the bridge, and any other options such as conference record upon connection. The user could submit a text via their device to a text enabled toll-free number, or short code. The application/virtual assistant/bot would recognize an intent to register and provide instructions for the registration process, which would include gathering, bridge details, a start time, and confirmation of a number used to connect to the conference. Users may register from a different phone than the one used for the conference.

A same process could be performed via TWITTER direct messaging as well as via FACEBOOK messenger. If texting via the text enabled bridge number, it may be assumed that they are wanting to use that number for the bridge. Preference(s) may be stored in the mobile/desktop application. There are currently an IUM app for both Desktop and Mobile that stored connection info), or we could store in a preference database. If stored outside of the application, preferences would need to be based on the phone number, or require a user ID/password. They could also be presented as an option to associate the number used to that particular preference account.

In one example method of operation, a method may provide a user device being used to access a link to a conference invite. The resulting webpage/application opens and has user specific information and instructions on how/when to connect to the conference. The user may select the phone number from a drop down list, or enters a new number, which is the number to be dialed. The user selects how early they want to be connected to the bridge from a drop down list. Ideally, that would be limited to 5 min before start time, but could permit for other timeframes as well. Once the bridge contacts the user, a customer would just need to press a key to join the active conference. Optionally, automatic speech recognition could be used to join in the event that hands free access is required.

In another example embodiment, a user texts a bridge number that they want to preregister for a conference call, such as "Call me at 5:30". The virtual assistant 'bot'/application responds back gathering additional information as needed. The assistant would recognize that the user wants to preregister for a call at 530 and would request additional details in a directed dialog manner gathering bridge ID, and confirming the phone number to dial. Optionally, if a short code was used, the bridge number will also be gathered. Optionally, the system could ask the customer if they are the leader, and if so, gather leader details and conference start options.

The assistant may also package-up the entire request and request a confirmation. For example, the assistant may confirm the setup by stating "We will call you at 5551234567 at 530 and connect you to bridge 5557654321, correct?", and the user could accept. If user does not confirm, they will be prompted about each element to obtain correct information and asked to reconfirm. Once the bridge contacts the user at the correct time, the customer would just need to press a key to join. Optionally, the voice recognition could be used to join.

In another example embodiment, a user may submit a text to a bridge number that they want to preregister for a conference call. For example, "Call me at 530", a virtual assistant bot application may respond back, "Hello Dave, what is the Conference ID you would like us to connect you to", the user may responds with a particular number "5551234567", and if the conference ID matches the ID stored, as being their bridge identified in their profile, they will be prompted if they want the system to start the bridge. If so, they will be prompted with their stored parameters, such as leader pin and start with record/mute. The virtual assistant responds back with confirmation, such as "Thanks, we will call you at 5551234567 at 530 and connect you to bridge 5557654321, correct?, and the user accepts the registration If user does not confirm, they will be prompted about each element to get correct info and asked to reconfirm. Once the bridge contacts them, the customer would just need to press a key to join via their device or speak to the bot application.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example network element 500, which may represent any of the above-described network components of the other figures.

Figure 5:
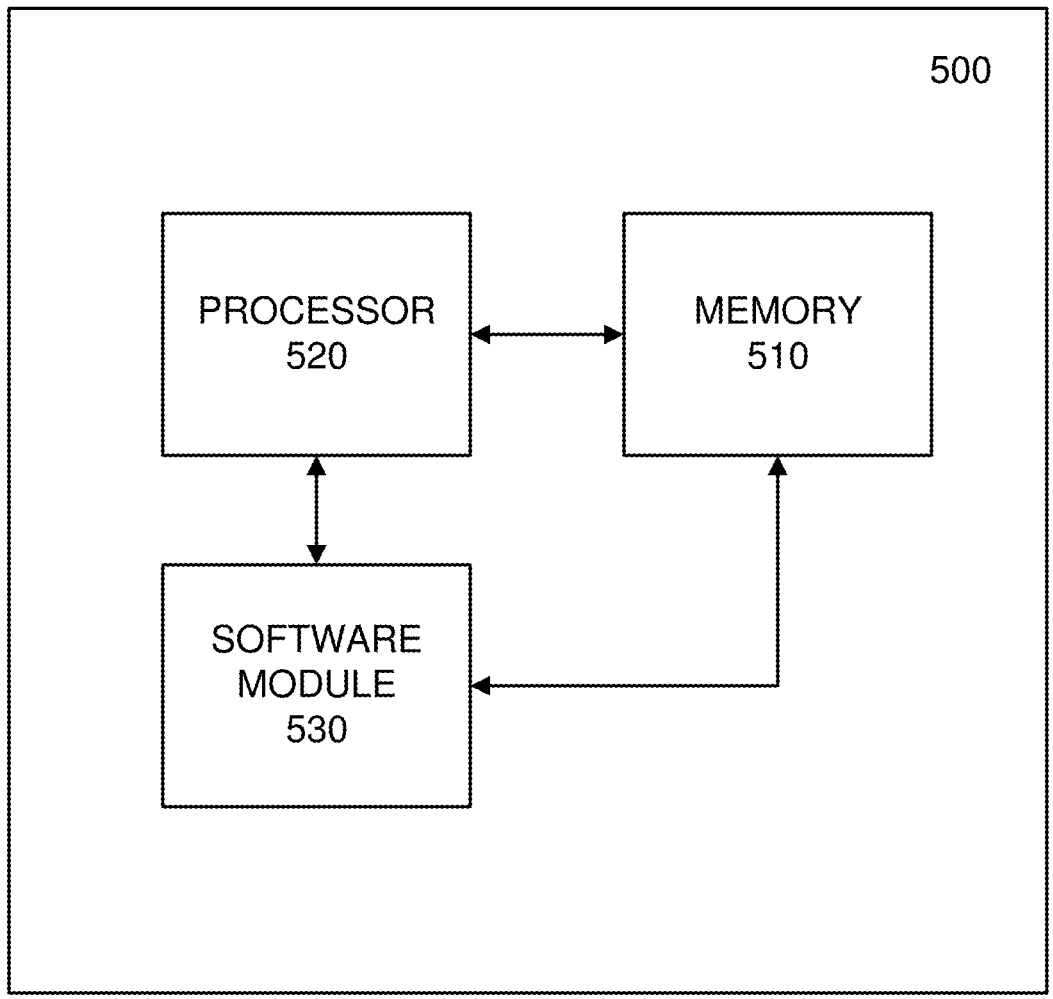
FIG. 5 illustrates an example network entity device configured to store instructions, software, and corresponding hardware for executing the same, according to example embodiments of the present application.

As illustrated in FIG. 5, a memory 510 and a processor 520 may be discrete components of the network entity 500 that are used to execute an application or set of operations. The application may be coded in software in a computer language understood by the processor 520, and stored in a computer readable medium, such as, the memory 510. The computer readable medium may be a non-transitory computer readable medium that includes tangible hardware components in addition to software stored in memory. Furthermore, a software module 530 may be another discrete entity that is part of the network entity 500, and which contains software instructions that may be executed by the processor 520. In addition to the above noted components of the network entity 500, the network entity 500 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
   transmitting a message from a conference call server to a user device, the message notifying the user device of a conference call and prompting a user to request a conference callback, the message comprising a conference identifier;
   receiving a response message from the user device, the response message comprising a passcode for a conference associated with the conference identifier and a conference callback request comprising at least a request for access to a conference bridge that will host a conference identified by the conference identifier via a callback option;
   extracting response message data including the conference identifier and passcode;
   processing the response message data and identifying one or more conference call parameters, including the conference identifier, the passcode and a scheduled time of the conference;
   linking a user profile for the user device to the conference data using the passcode;
   transmitting a notification to the user device when a scheduled conference call time has matured; and
   joining the user device to the conference without again requiring the passcode to be sent from the user device.

2. The method of claim 1, wherein the message comprises at least one of a short message service (SMS) message and voice command message.

3. The method of claim 1, wherein the conference call parameters comprise a plurality of conference call preferences.

4. The method of claim 1, wherein the plurality of conference call preferences comprise a time to bridge the user device to the conference call, and a number to dial to access the user device.

5. The method of claim 1, further comprising:
   identifying the user device as a current device;
   identifying a recently used application on the user device as a current application;
   determining whether the recently used application is a conference compatible application; and
   when the recently used application is a conference compatible application, designating the recently used application as the conference setup application.

6. The method of claim 5, wherein the conference compatible application comprises one or more of a voice compression application, a social media application, a conference call application, and a web browser application.

7. The method of claim 1, wherein the transmitting the message from the conference call server to the user device further comprises initiating a voice command on the user device, and wherein receiving a response message from the mobile device further comprises receiving a voice command on the user device.

8. An apparatus, comprising:
   a transmitter configured to transmit a message from a conference call server to a user device, the message comprising a notification the user device of a conference call and prompting a user to request a conference callback, the message comprising a conference identifier;
   a receiver configured to receive a response message from the user device, the response message comprising a passcode for a conference associated with the conference identifier and a conference callback request comprising at least a request for access to a conference bridge that will host a conference identified by the conference identifier via a callback option;
   a processor configured to
      extract response message data including the conference identifier and the passcode;
      process the response message data and identify one or more conference call parameters, including the conference identifier and a scheduled time of the conference; and
      link a user profile for the user device to the conference data using the passcode;
   wherein the transmitter is further configured to transmit a notification to the user device when a scheduled conference call time has matured; and
   wherein the processor is configured to join the user device to the conference without again requiring the passcode to be sent from the user device.

9. The apparatus of claim 8, wherein the message comprises at least one of a short message service (SMS) message and voice command message.

10. The apparatus of claim 8, wherein the conference call parameters comprise a plurality of conference call preferences.

11. The apparatus of claim 8, wherein the plurality of conference call preferences comprise a time to bridge the user device to the conference call, and a number to dial to access the user device.

12. The apparatus of claim 8, wherein the processor is further configured to
   identify the user device as a current device;
   identify a recently used application on the user device as a current application;

determine whether the recently used application is a conference compatible application; and when the recently used application is a conference compatible application, designate the recently used application as the conference setup application.

13. The apparatus of claim 12, wherein the conference compatible application comprises one or more of a voice compression application, a social media application, a conference call application, and a web browser application.

14. The apparatus of claim 8, wherein the transmitter transmits the message from the conference call server to the user device by initiating a voice command on the user device, and wherein the receiver receives the response message from the mobile device by further receiving a voice command on the user device.

15. A non-transitory computer readable storage medium configured to store instructions that when executed:

transmitting a message from a conference call server to a user device, the message comprising a notification to the user device of a conference call and prompting a user to request a conference callback, the message comprising a conference identifier;

receiving a response message from the user device, the response message comprising a passcode for a conference associated with the conference identifier and a conference callback request comprising at least a request for access to a conference bridge that will host a conference identified by the conference identifier via a callback option;

extracting response message data including the conference identifier and the passcode;

processing the response message data and identifying one or more conference call parameters, including the conference identifier and a scheduled time of the conference;

linking a user profile for the user device to the conference data using the passcode;

transmitting a notification to the user device when a scheduled conference call time has matured; and joining the user device to the conference without again requiring the passcode to be sent from the user device.

16. The non-transitory computer readable storage medium of claim 15, wherein the message comprises at least one of a short message service (SMS) message and voice command message.

17. The non-transitory computer readable storage medium of claim 15, wherein the conference call parameters comprise a plurality of conference call preferences.

18. The non-transitory computer readable storage medium of claim 15, wherein the plurality of conference call preferences comprise a time to bridge the user device to the conference call, and a number to dial to access the user device.

19. The non-transitory computer readable storage medium of claim 15, wherein the processor is further configured to perform:

identifying the user device as a current device;

identifying a recently used application on the user device as a current application;

determining whether the recently used application is a conference compatible application; and when the recently used application is a conference compatible application, designating the recently used application as the conference setup application.

20. The non-transitory computer readable storage medium of claim 19, wherein the conference compatible application comprises one or more of a voice compression application, a social media application, a conference call application, and a web browser application, and wherein the transmitting the message from the conference call server to the user device further comprises initiating a voice command on the user device, and wherein receiving a response message from the mobile device further comprises receiving a voice command on the user device.

* * * * *